United States Patent
MacInnis et al.

(10) Patent No.: US 7,630,566 B2
(45) Date of Patent: Dec. 8, 2009

(54) METHOD AND APPARATUS FOR IMPROVED ESTIMATION AND COMPENSATION IN DIGITAL VIDEO COMPRESSION AND DECOMPRESSION

(75) Inventors: Alexander G MacInnis, Los Altos, CA (US); Sheng Zhong, Fremont, CA (US); Jose R Alvarez, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 470 days.

(21) Appl. No.: 10/247,940

(22) Filed: Sep. 20, 2002

(65) Prior Publication Data

US 2003/0058949 A1    Mar. 27, 2003

Related U.S. Application Data (60) Provisional application No. 60/325,050, filed on Sep. 25, 2001.

(51) Int. Cl.
    *G06K 9/36*    (2006.01)
    *G06K 9/46*    (2006.01)
(52) U.S. Cl. ..................... 382/238; 382/236
(58) Field of Classification Search .............. None
    See application file for complete search history.

(56) References Cited

U.S. PATENT DOCUMENTS

| | | | | |
|---|---|---|---|---|
| 5,144,423 A | * | 9/1992 | Knauer et al. | 375/240.17 |
| 5,504,849 A | * | 4/1996 | Brusewitz | 345/475 |
| 5,684,538 A | * | 11/1997 | Nakaya et al. | 375/240.17 |
| 5,754,240 A | * | 5/1998 | Wilson | 375/240.15 |
| 5,784,114 A | * | 7/1998 | Borer et al. | 348/452 |
| 5,907,362 A | * | 5/1999 | Yamamoto | 375/240.04 |
| 6,069,670 A | * | 5/2000 | Borer | 348/620 |
| 6,307,887 B1 | * | 10/2001 | Gabriel | 375/240.16 |
| 6,381,279 B1 | * | 4/2002 | Taubman | 375/240.18 |
| 6,442,203 B1 | * | 8/2002 | Demos | 375/240.16 |

(Continued)

FOREIGN PATENT DOCUMENTS

EP        0294962 A    12/1988

OTHER PUBLICATIONS

Girod, B. , "Motion-Compensating Prediction with Fractional-Pel Accuracy", IEEE Transactions on Communications, IEEE Inc., New York, NY, USA, vol. 41, No. 4, Apr. 1, 1993 pp. 604-612, XP000372701 ISSN: 0090-6778.

(Continued)

*Primary Examiner*—Yuzhen Ge
(74) *Attorney, Agent, or Firm*—McAndrews Held & Malloy, Ltd.

(57) ABSTRACT

A method and apparatus are disclosed for performing motion estimation and compensation to fractional pixel accuracy using polyphase prediction filters as part of a video compression/decompression technique. A motion estimator applies a set of polyphase filters to some data in the reference picture and generates motion vectors, an estimated macroblock of video data, and a residual error macroblock of video data. The data referenced in the reference picture usually have more data than a macroblock since multi-tap filtering needs to access more data. A motion compensator generates a compensated macroblock of video data in response to the reference video data, the residual error macroblock of video data, and a polyphase prediction filter decided by the motion vector. The reference video data are usually reconstructed at the compensator side.

21 Claims, 9 Drawing Sheets

U.S. PATENT DOCUMENTS

| | | | | |
|---|---|---|---|---|
| 6,639,944 B1 * | 10/2003 | De Haan et al. | ......... | 375/240.17 |
| 6,714,593 B1 * | 3/2004 | Benzler et al. | ......... | 375/240.16 |
| 6,757,022 B2 * | 6/2004 | Wredenhagen et al. | ..... | 348/452 |
| 6,950,469 B2 * | 9/2005 | Karczewicz et al. | ... | 375/240.17 |
| 2001/0055340 A1 * | 12/2001 | Kim et al. | .............. | 375/240.21 |
| 2002/0025077 A1 * | 2/2002 | De Haan et al. | ............. | 382/238 |

OTHER PUBLICATIONS

Pang, KK et al, "Optimum Loop Filter in Hybrid Coders", IEEE Transactions on Circuits and Systems for Video Technology, IEEE Inc. New York, NY, USA, vol. 4, No. 2, Apr. 1, 1994 pp. 158-167, XP000489688, ISSN: 1051-8215.

* cited by examiner

METHOD AND APPARATUS FOR IMPROVED ESTIMATION AND COMPENSATION IN DIGITAL VIDEO COMPRESSION AND DECOMPRESSION

RELATED APPLICATIONS

The applicants claim priority based on provisional application No. 60/325,050 filed Sep. 25, 2001, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Certain embodiments of the present invention relate to digital video compression and decompression. More specifically, certain embodiments relate to a method and apparatus for motion estimation and compensation in digital video compression and decompression.

Digital video compression schemes, such as MPEG-2 for example, are well known in the art. MPEG-2 uses motion compensated predictive coding to encode a sequence of pictures. This coding entails predicting a two-dimensional block of pixels by translating or interpolating a similar array of pixels from another picture (referred to as the "reference picture") in the sequence.

Various compression schemes use different sizes of blocks of pixels. For example MPEG-2 uses a 16×16 or 16×8 block of pixels (referred to as a "macroblock"; the terms "block" and "macroblock" may be used interchangeably). Prediction can usually reduce the amount of data that needs to be stored or transmitted, since only the difference between the actual image macroblock and the predicted macroblock need be coded and transmitted. For example, if the predicted macroblock is similar to the actual image macroblock, then the difference between the two macroblocks is very small. Therefore the information content in the difference may be represented in a smaller number of digital bits in comparison to coding and transmitting the original image data. The more accurate the prediction is, the more effective the compression system becomes.

The amount of translation for the reference picture macroblock is indicated by a motion vector, which is encoded as part of the compressed data stream. The motion vector has horizontal and vertical components, indicating the spatial displacement to be applied to a reference macroblock in order to arrive at a predicted macroblock location. However, the displacement may generate a translation that does not coincide with a integer sampling grid position of the picture. The integer sampling grid positions are referred to as the "integer pixel positions" and the positions in between the integer positions are referred to as the "fractional pixel positions".

The smallest fractional-pixel position in the translation process determines the accuracy of the motion vectors used for prediction. Various known prediction schemes are used in video coding. For example, MPEG-1 and MPEG-2 use ½-pixel accuracy, while MPEG-4 Video Object Plane prediction uses ½-pixel and ¼-pixel accuracy and H.26L (also known as MPEG AVC or JVT or H.264) prediction uses ¼-pixel and ⅛-pixel prediction accuracy. All of these schemes utilize interpolation in at least one step in the prediction process. For example, in MPEG-1 and MPEG-2 for example, averaging adjacent integer-position pixels produces half-pixel position values.

In H.26L prediction, the ¼-pixel positions are created by first performing a 6-tap interpolative filter on the integer-position pixels obtaining the nearest ½-pixel position, then the nearest integer and ½-pixel positions are averaged to obtain the desired ¼-pixel position. When calculating the ⅛-pixel positions in H.26L prediction, the nearest ¼-pixel positions are created using an 8-tap interpolative filter, then the nearest ¼-pixel positions are averaged to get the desired ⅛-pixel position. In some implementations of such codec schemes, the averaging function is combined with the 8-tap, ¼-pixel filtering function into a single 8-tap filter to produce the same result as provided previously.

Performing averaging to obtain pixel positions between two pixel positions results in image distortion and impaired prediction of the image macroblock, thereby reducing the effectiveness of the compression and decompression system. Furthermore, the distinct operations of filtering and averaging result in unnecessarily complex implementations compared to embodiments of the present invention.

It is well known in the art how to design motion estimation and compensation systems for video compression, using the various fractional pixel interpolation techniques described above.

Further limitations and disadvantages of conventional and traditional approaches will become apparent to one of skill in the art, through comparison of such systems with embodiments of the present invention as set forth in the remainder of the present application with reference to the drawings.

A need exists for an approach to perform efficient video compression and decompression to fractional pixel accuracy with a simply implemented architecture.

BRIEF SUMMARY OF THE INVENTION

An embodiment of the present invention provides motion estimation and compensation to fractional pixel accuracy using polyphase filters as part of a video compression and decompression technique. An embodiment of the present invention uses a polyphase filter framework to directly produce a translation of an image macroblock. The polyphase framework has the same number of phases as the number of fractional pixel positions required by the video compression/decompression technique.

A method is provided for performing motion estimation and compensation to fractional pixel accuracy using polyphase filters as part of a video compression/decompression technique. A set of polyphase prediction filters are selected based on a desired fractional pixel resolution of the motion estimation. A current macroblock of video data is examined and a reference macroblock of video data is selected from a reference video image in response to the current macroblock of video data such that the reference macroblock of video data is most similar to the current macroblock of video data in certain criterion such as Minimum Absolute Error. A set of estimated macroblocks of video data is generated, having the fractional pixel resolution, in response to the reference macroblock of video data and the set of polyphase prediction filters. A macroblock of video data is selected from the set of estimated macroblocks of video data in response to the current macroblock of video data such that the estimated macroblock of video data is most similar to the current macroblock of video data, or similar selection algorithm at the discretion of the video encoder. A motion vector and a residual error macroblock of video data are generated in response to the reference macroblock of video data, the current macroblock of video data, and the estimated macroblock of video data. The reference macroblock of video data, the motion vector, and the residual error macroblock of video data may be used to re-create the current macroblock of video data.

Apparatus is provided for performing motion estimation and compensation to fractional pixel accuracy using polyphase prediction filters as part of a video compression and decompression technique. The apparatus includes a motion estimator applying a set of polyphase filters to some data in the reference picture and generating motion vectors, an estimated macroblock of video data, and a residual error macroblock of video data. The data referenced in the reference picture usually have more data than a macroblock since multi-tap filtering needs to access more data. The apparatus also includes a motion compensator generating a compensated macroblock of video data in response to the reference video data, the residual error macroblock of video data, and a polyphase prediction filter decided by the motion vector. The reference video data are usually reconstructed at the compensator side in video decoders.

Certain embodiments of the present invention afford an approach to facilitate efficient video compression and decompression of video data by reducing the residual error data to be stored or transmitted.

DETAILED DESCRIPTION OF THE INVENTION

Figure 1:
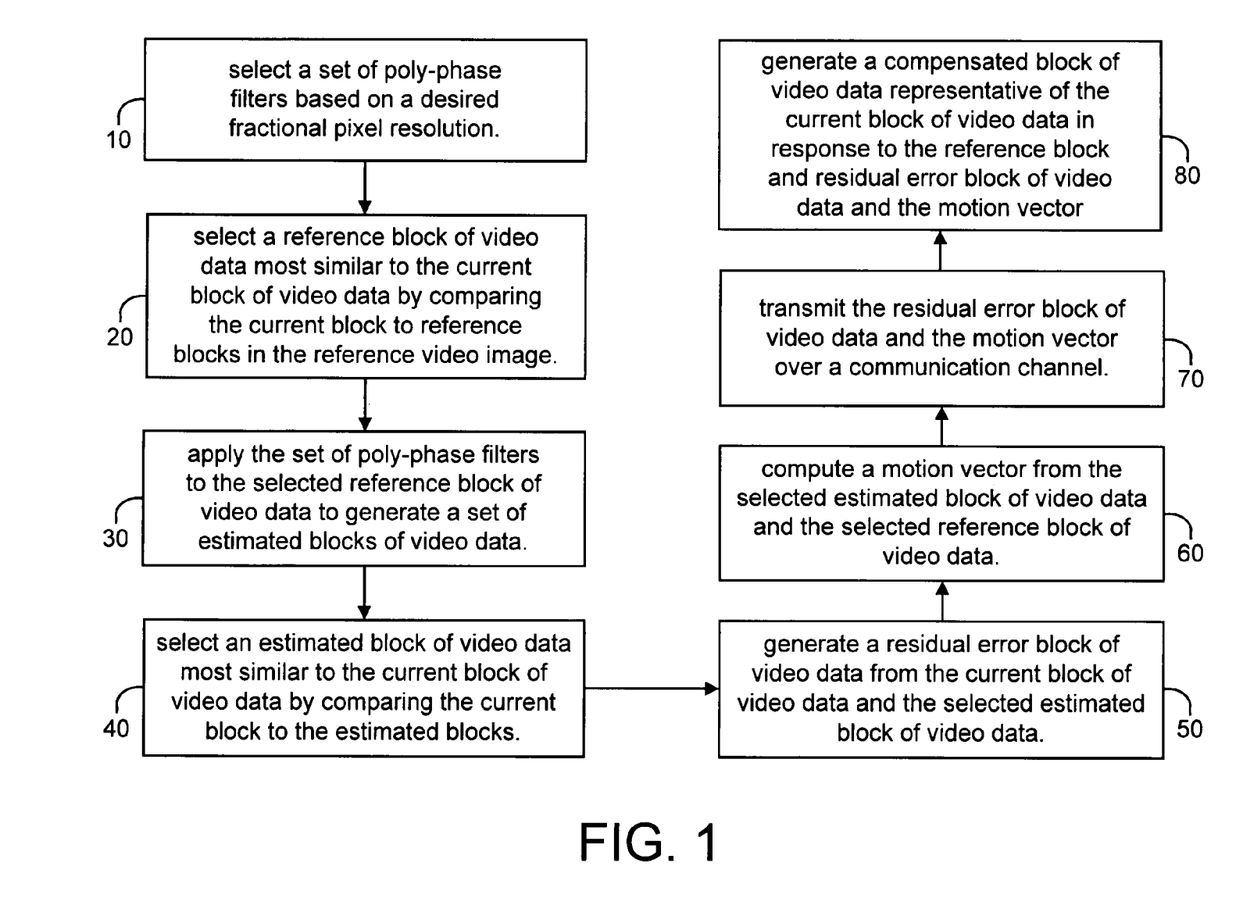
FIG. 1 is a flowchart of a method for performing motion estimation and compensation to fractional pixel accuracy using polyphase prediction filters as part of a video compression and decompression technique in accordance with an embodiment of the present invention.

FIG. 1 is a flowchart of a method for performing motion estimation and compensation to fractional pixel accuracy using polyphase prediction filters as part of a video compression/decompression technique in accordance with an embodiment of the present invention.

Figure 1A:
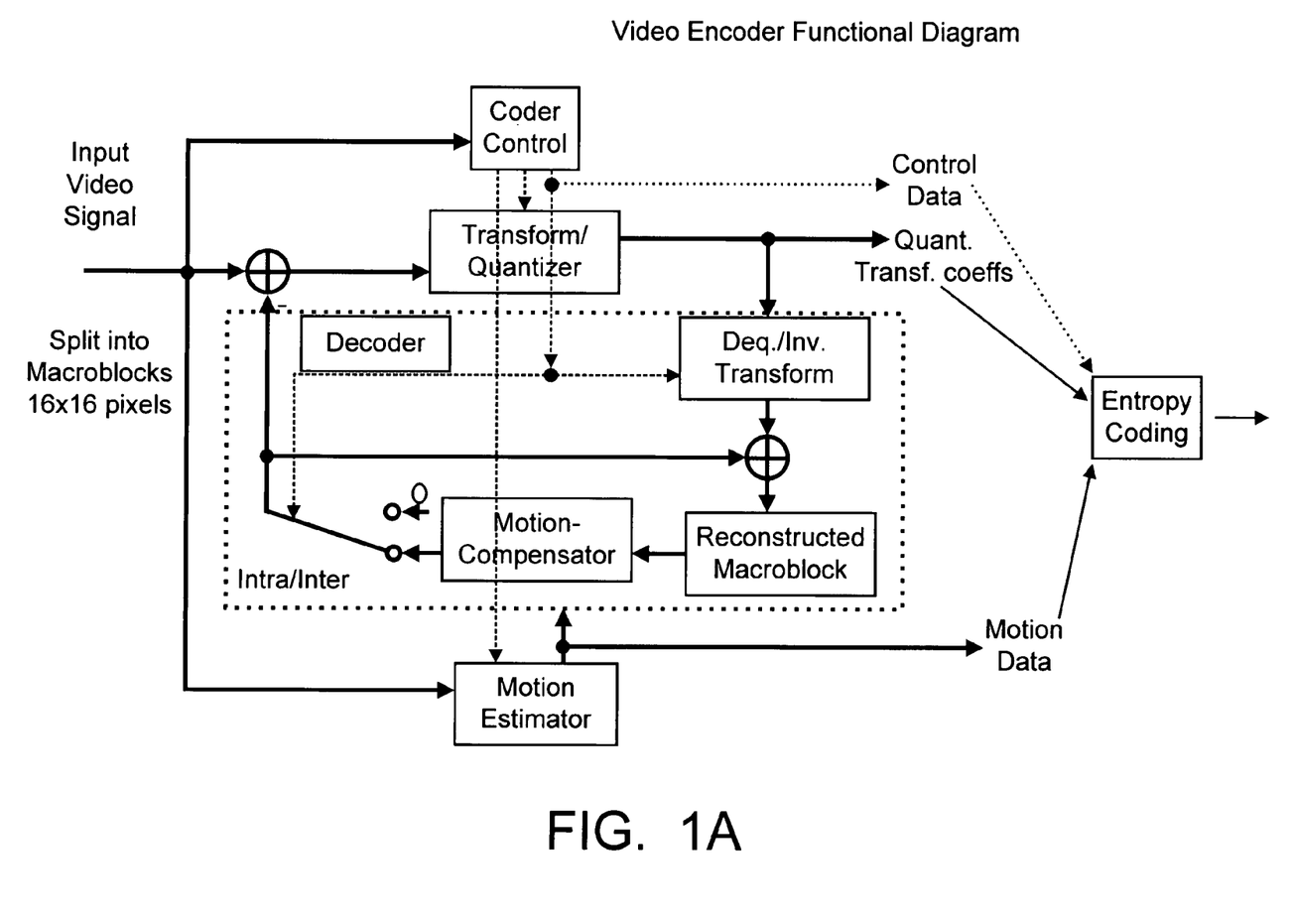
FIG. 1a is a schematic block diagram of video encoder using motion estimation and compensation as part of its compression process in accordance with an embodiment of the present invention

FIG. 1a is a schematic block diagram of a video encoder which uses motion compensation as part of its video compression process. This FIG. 1A is representative of video encoders compliant with such standards as MPEG-1, MPEG-2, MPEG-4, H.263, and H.26L (proposed).

Figure 2:
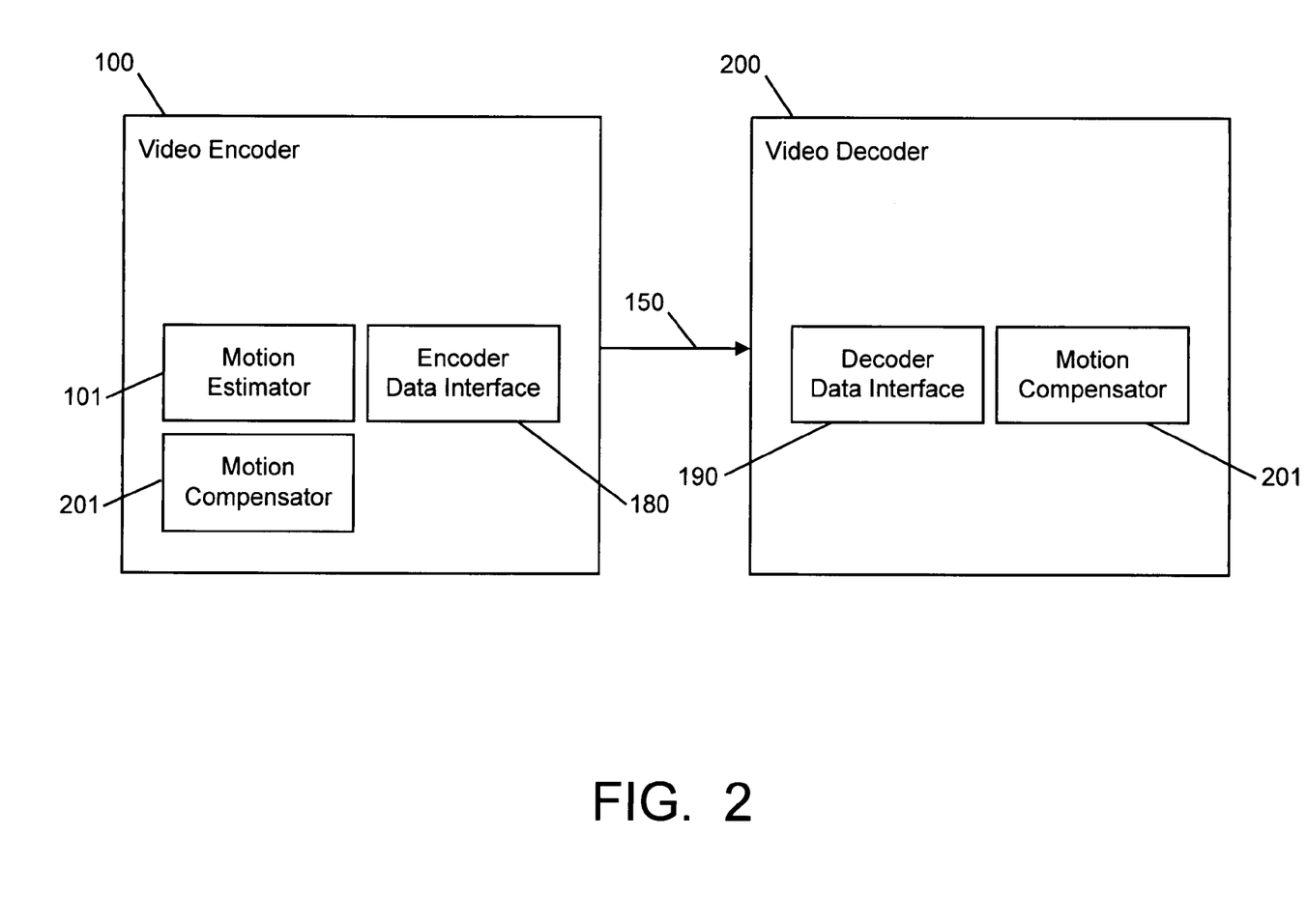
FIG. 2 is a schematic block diagram of a system including an apparatus for performing motion estimation and compensation to fractional pixel accuracy using polyphase prediction filters as part of a video compression/decompression technique in accordance with an embodiment of the present invention.

FIG. 2 is a schematic block diagram of a system including an apparatus for performing motion estimation and compensation to fractional pixel accuracy using polyphase prediction filters as part of a video compression/decompression technique in accordance with an embodiment of the present invention. FIG. 2 shows a video encoder 100 and a video decoder 200. FIG. 2 shows a motion estimator 101 and a motion compensator 201 as elements of the video encoder 100, and it shows a motion compensator 201 as an element of video decoder 200. A communication channel 150 is shown interfacing video encoder 100, presumably at a first location, to video decoder 200, which is presumably at a second location. Communication channel 150 provides a means for transmitting compressed video data from video encoder 100 to video decoder 200.

Alternatively, video encoder 100 and decoder 200 may be co-located and the communication channel 150 used to transmit compressed video data to a storage medium such as an image server. The video data may then be compressed, transmitted to the storage medium, retrieved from the storage medium, and decompressed.

Figure 3:
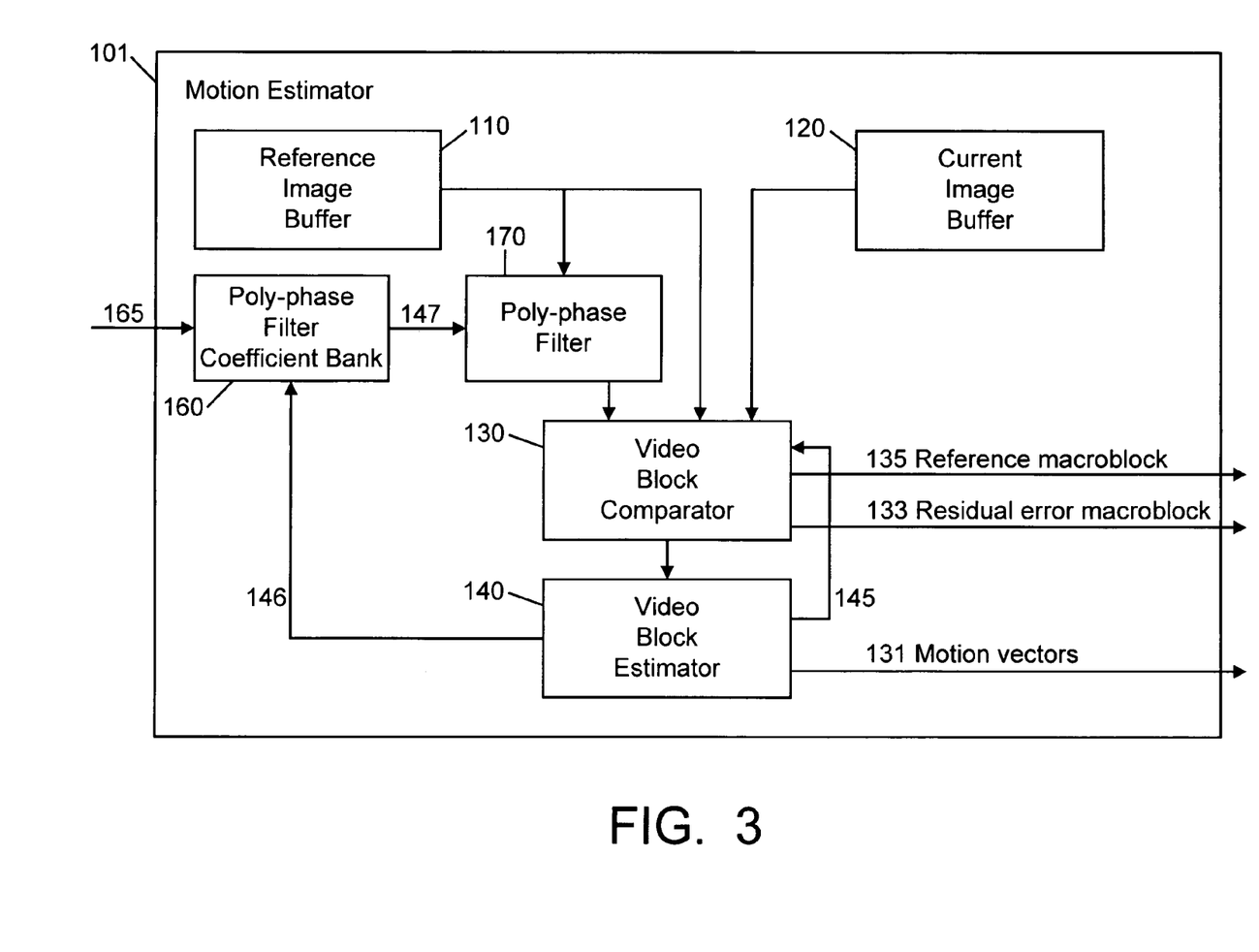
FIG. 3 is a schematic block diagram of the motion estimator element of the apparatus of FIG. 2 in accordance with an embodiment of the present invention.

FIG. 3 is a schematic block diagram of the motion estimator 101 of the apparatus of FIG. 2 in accordance with an embodiment of the present invention. Motion estimator 101 includes a reference image buffer 110, a current image buffer 120, a polyphase filter 170, a video block comparator 130, a video block estimator 140, and a polyphase filter coefficient bank 160.

In FIG. 3, the output of the reference image buffer 110 interfaces to the polyphase filter 170 and also to the video block comparator 130. The outputs of the polyphase filter 170, the reference image buffer 110 and of the current image buffer 120 interface to inputs of video block comparator 130 in order to input macroblocks of video data to video block comparator 130. The video block comparator can select between the reference image buffer 110 and the output of polyphase filter, as one of its inputs; the signal from reference image buffer 110 can be utilized in place of the signal from polyphase filter 170 when phase shift or pixel interpolation is not required. An output of video block comparator 130 connects to an input of video block estimator 140. An output of video block estimator 140 connects to an input of video block comparator 130, and another output of video block estimator 140 connects to an input of the polyphase filter coefficient bank 160. An output of polyphase filter coefficient bank 160 connects to an input of polyphase filter 170.

Figure 3A:
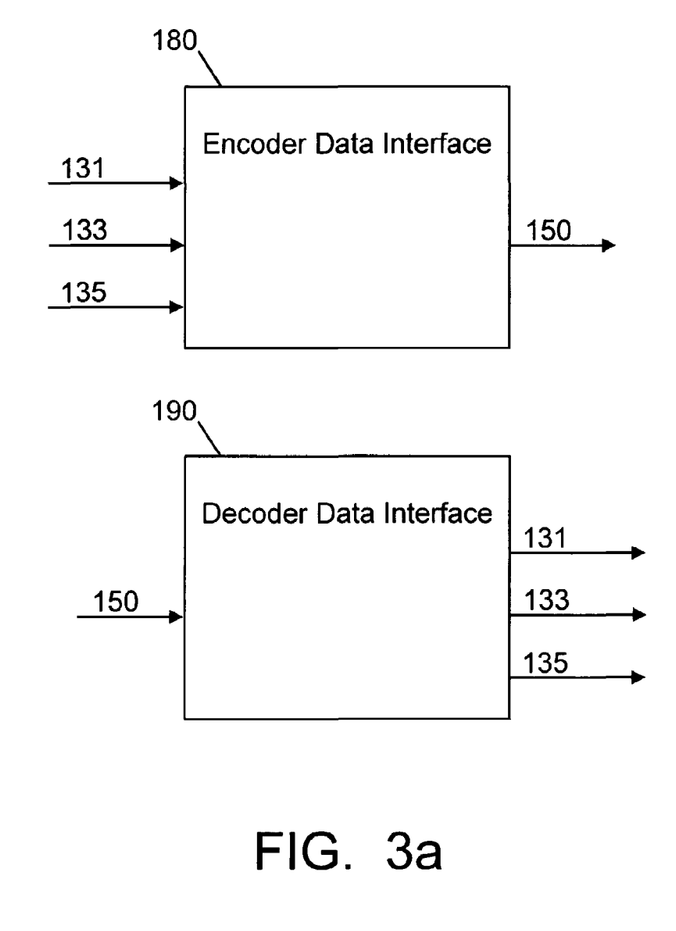
FIG. 3a is a schematic block diagram of the data interface components of FIG. 2 in accordance with an embodiment of the present invention.

FIG. 3a illustrates encoder data interface 180 and decoder data interface 190. Encoder data interface 180 interfaces to signals 131, 133 and 135 from motion estimator 101, and to communications channel 150. Decoder data interface 190 interfaces to communications channel 150 and to signals 131, 133, and 135 to the motion compensator in the decoder.

Figure 4:
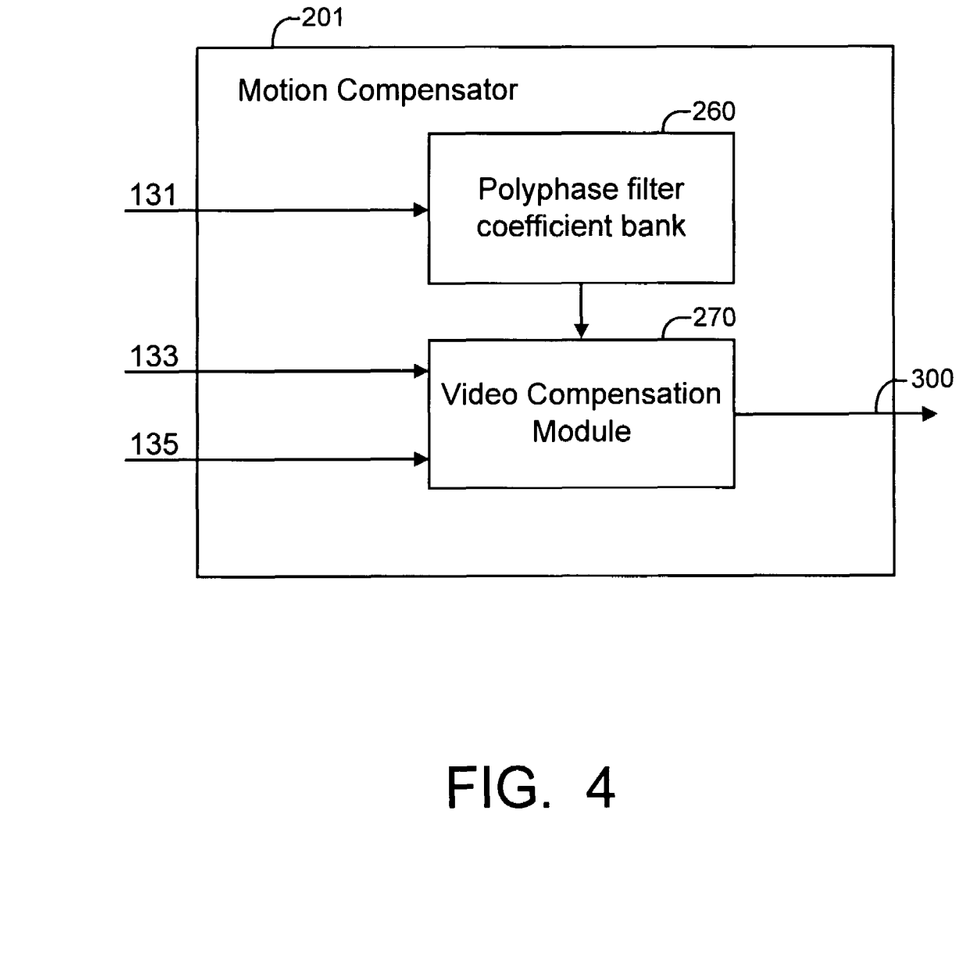
FIG. 4 is a schematic block diagram of the motion compensator element of the apparatus of FIG. 2 in accordance with an embodiment of the present invention.

FIG. 4 is a schematic block diagram of the motion compensator 201 of the apparatus of FIG. 2 in accordance with an embodiment of the present invention. Motion compensator 201 includes a polyphase filter coefficient bank 260 and a video compensation module 270.

An output of polyphase filter coefficient bank 260 connects to an input of video compensation module 270. A motion vector signal 131 connects to an input 131 of polyphase filter coefficient bank 260. A residual error macroblock signal 133 connects to a first input 133 of video compensation module 270. A reference macroblock signal 135 connects to a second input 135 of video compensation module 270. In an embodiment of the present invention, connections 131, 133, and 135 may be separate, dedicated interfaces to motion estimator 101, for example in a video encoder 100. In an alternative embodiment of the present invention connections 131, 133, and 135 may be interfaces to decoder data interface 190, for example in a video decoder 200.

The various elements illustrated in FIGS. 2, 3, 3a, and 4 may be dedicated hardware elements such as circuit boards with digital signal processors or may be software running on a general purpose computer or processor such as a commercial, off-the-shelf PC. Also, the various elements may be embedded in a single video processing chip. The various elements may be combined or separated according to various embodiments of the present invention.

Figure 5:
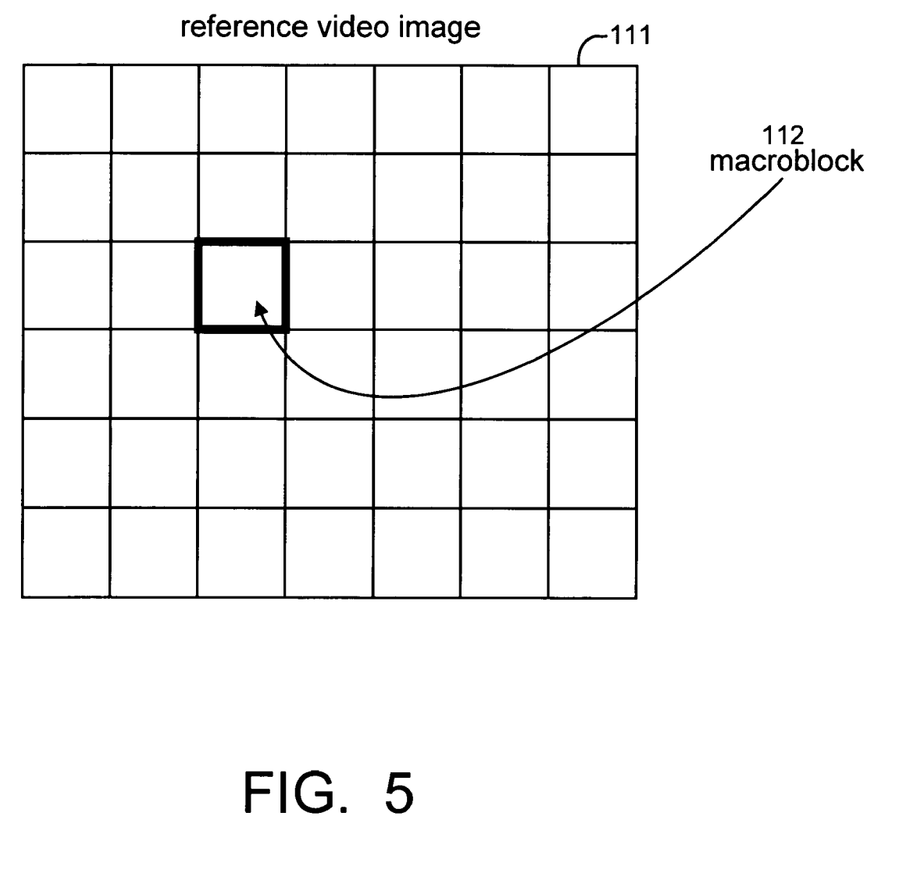
FIG. 5 is an exemplary schematic of a video image. The current image to be coded is usually made up of macroblocks of video data in accordance with an embodiment of the present invention. A reference image may have a reference macroblock starting at any position, including fractional ones.

In an embodiment of the present invention, a motion estimation method provides motion compensation prediction to minimize the data bits that are required to be transmitted. An embodiment of the present invention also provides for less expensive and less complex structures and mechanisms for encoding and decoding video. One of the motion estimation methods searches for the (locally) most-similar macroblock (denoted as the reference macroblock) in the integer positions first and then refines to fractional positions by using the reference macroblock and data around it. Referring to FIG. 5, the reference macroblock 112 is first found in the reference video image 111 and its surrounding data are used in the refining prediction (estimation) process through filtering using a set of polyphase prediction filters.

In an embodiment of the present invention, polyphase prediction filters perform motion compensated prediction to fractional pixel accuracy. A polyphase filter structure is used to directly produce an optimized translation of the predicted video macroblock. The polyphase filter structure has the same number of phases as the number of fractional pixel positions required by the video compression algorithm. For example, in a system with ¼-pixel resolution, the polyphase prediction filters have four unique phases for the horizontal axis, and four unique phases for the vertical axis. In the case of ⅛-pixel resolution, for example, the polyphase filters have eight unique phases for each axis. It is also recognized that the 8-phase filter can also be used in ¼-pel position interpolation. Other embodiments are contemplated in which the set of coefficients for one axis is the same as the set of coefficients for the other axis.

Figure 6:
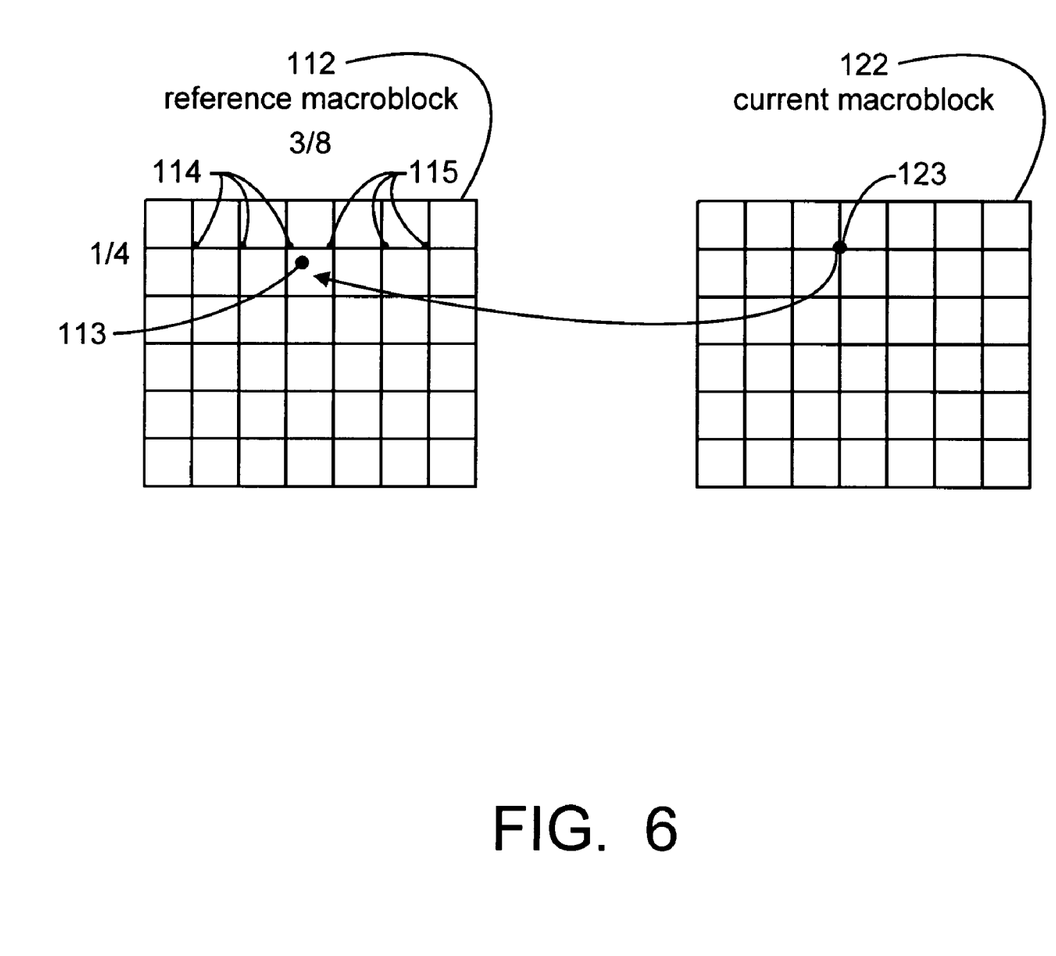
FIG. 6 illustrates the movement of a pixel position between a reference macroblock and a current macroblock of video data.

For example, in FIG. 6, a current macroblock 122 of video data has moved with respect to a reference macroblock 112 of video data. More specifically, any given pixel 123 in the current macroblock 122 has moved ¼ of a pixel in the horizontal direction and ⅜ of a pixel in the vertical direction. In other words, the current macroblock 122 of video data has moved to a new fractional pixel position 113 with respect to the reference macroblock 112. Polyphase prediction filters may be used to translate the reference macroblock 112 accounting for the fractional pixel movement and associated phase shift. In the example, the polyphase filter structure supports eight phases or fractional pixel positions between integer pixel positions, thus providing a fractional pixel accuracy of ⅛ pixel.

In H.26L prediction, it is necessary to perform a series of tests depending on the relative position of the desired sub-pixel location with respect to the integer-pixel positions. An embodiment of the present invention uses a well-defined and regularized method that applies equally to all fractional-pixel positions without having to consider the relative position of the desired interpolated pixel with respect to the integer-pixel data. The regular structure enables the design of simple hardware for the application of motion translation of reference macroblock data.

Embodiments of the present invention are simple to implement and do not require performing tests on the relative positions of fractional-pixels. Further embodiments of the present invention do not require performing different levels of filtering. The simplicity reduces production and operation costs. For example, the polyphase structure may be expressed by a single FIR filter with loadable coefficients. Particular coefficients are selected by a simple decision based on the fractional-pixel position. The implementation may be effected by very simple hardware and software.

Referring to FIG. 1, in step 10, a particular set of polyphase prediction filters is selected based on a desired fractional pixel resolution. If a ⅛ pixel fractional pixel resolution is desired, then a set of eight polyphase prediction filters are selected, one filter for each phase between integer pixel locations. The same eight filters may be used for both horizontal and vertical directions or separate, dedicated sets of filters may be selected for each axis.

As an illustration and corresponding to the motion estimation method described above, steps 20 and 30 in FIG. 1 show one of the embodiments of the invention. In step 20, a current macroblock 122 of video data is compared to the macroblocks whose top-left corner starts at integer positions in a reference image 111. The comparison is accomplished by video block comparator 130 (see FIG. 3). Video block comparator 130 selects a reference macroblock 112 that is closest (or locally closest) to the current macroblock 122 (see FIG. 6).

Figure 7:
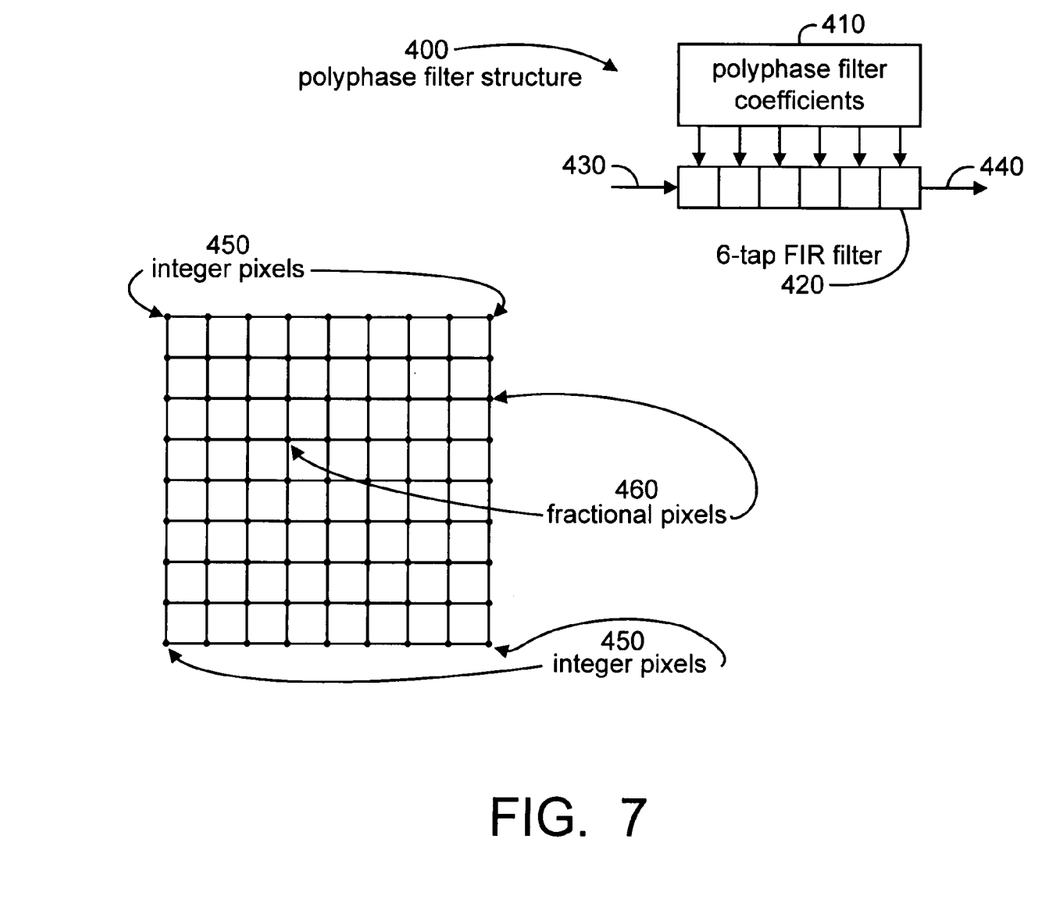
FIG. 7 illustrates the relationship between integer pixels and fractional pixels and also shows an exemplary schematic of a polyphase filter structure in accordance with an embodiment of the present invention.

In step 30, polyphase prediction filters are applied to the selected reference macroblock 112 and its neighboring data according to the fractional pixel positions to generate estimated macroblocks to compare with the current macroblock and get the final closest estimated reference macroblock, which may start at a fractional pixel. FIG. 7 shows an example of a fractional pixel array bounded by four integer pixels 450 on the corners and comprising a set of fractional pixels 460. The array comprises a total of 81 pixel positions. The polyphase filter structure 400 is used to generate the set of estimated macroblocks of video data. In one embodiment of the present invention, the polyphase filter structure 400 comprises a bank of polyphase filter coefficients 410 from which to select, and a 6-tap FIR filter structure 420 to which the filter coefficients may be applied. In FIG. 3, the structure is represented by the polyphase filter coefficient bank 160 and polyphase filter 170.

Each phase of the polyphase filter structure, in accordance with an embodiment of the present invention, is designed to perform the correct phase shift for the fractional-pixel location, improving the resulting picture quality. The improvement is especially noticeable where fine horizontally or vertically oriented detail in the picture travel across the active displayed region. When only bilinear interpolation is used, the picture may exhibit phase shifts that are characterized by a pulsating effect on such details. The use of the correct interpolative phases in accordance with an embodiment present invention minimizes the pulsating effect and other artifacts generated as a consequence of improperly shifting the interpolative fractional-pixel phase.

For each row of pixels in the pixel array of FIG. 7, there is a corresponding set of polyphase filter coefficients for vertical interpolation filtering. Similarly, for each column of pixels in the array, there is a corresponding set of polyphase filter coefficients for horizontal interpolation filtering which may be the same or different from the set of filter coefficients for the rows. To generate a particular estimated macroblock of video data from the original reference macroblock, the 6-tap FIR filter is loaded up with integer pixel values from the reference macroblock.

For example, to generate the estimated macroblock corresponding to a shift in position of 3 fractional pixel positions in the horizontal direction (i.e. the ⅜ shift shown in FIG. 6), the polyphase filter coefficients corresponding to the third phase of the eight phases is applied to the FIR filter 420. The FIR filter is loaded with six integer pixel values from the reference macroblock 112 at filter input 430, three integer pixels 114 to the left of the fractional pixel of interest 113 and three integer pixels 115 to the right. Each integer pixel value in the filter 420 is multiplied by its corresponding filter coefficient. The products are then summed to generate the new fractional pixel value at filter output 440 corresponding to the horizontal component of fractional pixel position 113. The filtering process is performed for all integer pixels in the reference macroblock to generate the estimated macroblock corresponding to horizontal movement of three-phases (i.e. three fractional pixel locations in the horizontal direction). Filtering is then performed similarly in the vertical direction on the horizontally translated data to obtain the final estimated macroblock of video data. As shown in the example of FIG. 6, the vertical shift corresponds to ¼=⅔ or two fractional pixel positions. The filtering process of step 30 is performed for each of the possible fractional pixel positions 460. The result is multiple estimated macroblocks of video data, one macroblock for each fractional pixel position. Video block estimator 140 is structured to select the filter coefficients from polyphase filter coefficient bank 160 via connection 146, which coefficients are provided to polyphase filter 170 via connection 147. The polyphase filter 170 creates an estimated macroblock from reference image data using the coefficients so provided. The video block estimator also directs the video block comparator 170 via signal 145 to compare the estimated macroblocks from the polyphase filter.

In an embodiment of the present invention, a set of eight phases of 6-tap filter coefficients include the following:

Phase 0 filter: 0 0 256 0 0 0
Phase 1 filter: 5 −21 249 30 −8 1
Phase 2 filter: 8 −34 228 68 −17 3
Phase 3 filter: 9 −38 195 111 −27 6
Phase 4 filter: 8 −35 155 155 −35 8
Phase 5 filter: 6 −27 111 195 −38 9
Phase 6 filter: 3 −17 68 228 −34 8
Phase 7 filter: 1 −8 30 249 −21 5

In step 40, the video block comparator 130 compares the estimated macroblocks to the current macroblock 122 to determine the estimated macroblock that is most similar to the current macroblock 122. If the current macroblock 122 did indeed move by an exact number of fractional pixel positions, then the chosen estimated macroblock is typically very similar to the current macroblock 122 and it may have exactly the same value. However, it is often the case that the movement of the current macroblock is in between the fractional pixel locations. Even though the fractional pixel prediction may get close to estimating the current macroblock, a residual error will typically still exist between the two.

In step 50, the video block comparator 130 computes the residual error between the chosen estimated macroblock and the current macroblock 122 for each pixel position. The result is a residual error macroblock that is output from video block comparator 130 at output 133. If the difference between the chosen estimated macroblock and the current macroblock 122 is small, then the residual error macroblock may be represented with a small number of digital bits.

In step 60, video block estimator 140 computes a motion vector that is output from video block estimator 140 at output 131. The motion vector represents the fractional pixel movement component between the final reference macroblock as described above and the current macroblock 122. The motion vector may also be represented as a small number of digital bits. The reference macroblock 112 is also output from the video block comparator 130 at output 135.

In step 70, the motion vector, and the residual error macroblock, usually after they are processed and coded in certain form, are transmitted over a communication channel 150 to either a video storage device or to a video decoder 200 at a remote location. The (usually processed and coded) motion vector and the residual error macroblock represent the compressed video data for the current macroblock 122 of video data. As a result, video data may be transmitted much more efficiently and may be re-created later.

Once the data is compressed and transmitted and/or stored as a motion vector and a residual error macroblock, a current macroblock may be re-created by applying the motion vector and residual error macroblock to the reference macroblock of video data as shown in step 80. Referring to FIG. 4, the motion vector at input 131 selects the correct polyphase filter coefficients from the polyphase filter coefficient bank 260 in motion compensator 200 corresponding to the fractional pixel motion of the current macroblock with respect to the reference macroblock. The video compensation module 270 applies the selected polyphase filter coefficients to the reference macroblock 112 and its neighboring data that is input to the video compensation module 270 at input 135 to generate the estimated macroblock. The video compensation module 270 filters the reference macroblock 112, as previously described, to generate the estimated macroblock. The video compensation module 270 then applies the residual error macroblock, input to video compensation module 270 at input 133, to the estimated macroblock to generate the compensated macroblock which is a reconstruction of the current macroblock 122. The process is known as video reconstruction.

As a result, the current macroblock 122 is reconstructed. The reconstructed data may be selectively stored to be used as reference pictures for future pictures.

An embodiment of the present invention comprises applying a polyphase interpolative structure for the H.26L codec in the form of an 8-phase, 6-tap polyphase filter. The method may be applied to other codecs that require more accurate fractional pixel prediction, bearing in mind that the number of phases in the structure corresponds to the number of desired fractional pixel positions. There is no restriction on the number of taps in each phase.

In summary, certain embodiments of the present invention afford an approach to achieve efficient video compression/decompression of macroblocks of video data to fractional pixel accuracy by reducing the residual error data to be stored or transmitted. In an embodiment of the present invention used in H.26L prediction, a general form polyphase filter structure computes the fractional-pixel prediction for macroblocks of pixel data. The polyphase structure consists of 8 phases, each phase comprising six coefficients. The number of phases corresponds to the number of fractional pixel locations needed to perform up to ⅛-pixel prediction. Each ⅛-pixel location is assigned a set of coefficients corresponding to one phase of the polyphase filter structure. The computation of a fractional pixel position is done using a six-tap filter structure. The six-tap filter is implemented using one embodiment of a FIR filter structure. In the embodiment, it is not necessary to perform any other operation for the desired fractional pixel position other than selecting the set of coefficients assigned to the position as indicated by the corresponding phase of the polyphase filter. For two-dimensional prediction, the polyphase interpolation is performed first in one direction (horizontal or vertical) and then the resulting data is polyphase interpolated in the other direction. The regularized structure of an embodiment of the present invention enables the interpolation for any fractional pixel location regardless of the number of fractional pixel positions. Further, the same set of coefficients may be used to perform larger fractional-pixel positions. For example, the same set of coefficients used for ⅛-pixel interpolation may be used for ¼-pixel interpolation provided the correct phase is selected. For example, the selected phases may be 0, 2/8, 4/8, 6/8.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for performing motion estimation and compensation for a current block of video data to be compressed, said method comprising:
    selecting, by an encoder, a particular phase of a plurality of phases of a polyphase filter based on a desired fractional pixel position, by selecting coefficients for a particular one of the phases that corresponds to the particular one of the plurality of fractional positions between pixel positions, wherein the polyphase filter comprises six or more taps, wherein the plurality of phases correspond to fractional positions between two adjacent pixels comprising at least ¼ and ¾ of the two adjacent pixel positions;
    selecting a reference block of video data based on said current block of video data;
    generating a set of estimated blocks of video data, having said fractional pixel resolution, based on said reference block of video data and said polyphase filter; and
    selecting an estimated block of video data based on said current block of video data and said set of estimated blocks of video data.

2. The method of claim 1 wherein said reference block of video data is a subset of a reference video image.

3. The method of claim 1 wherein said current block of video data is a subset of a current video image.

4. The method of claim 1 wherein said reference block of video data is selected from a reference video image such that said reference block of video data is most similar to said current block of video data.

5. The method of claim 1 wherein said estimated block of video data is selected from said set of estimated blocks of video data such that said estimated block of video data is most similar to said current block of video data.

6. The method of claim 1 further comprising generating a residual error block of video data in response to said current block of video data and said estimated block of video data.

7. The method of claim 1 further comprising computing a motion vector based on said reference block of video data and said estimated block of video data.

8. The method of claim 1 wherein said of plurality of phases corresponds to a corresponding plurality of phases between integer pixel positions of said current block of video data.

9. An apparatus for performing motion estimation and compensation for a current block of video data, said apparatus comprising:
    a motion estimator that applies a particular phase of a plurality of phases of a polyphase filter by selecting coefficients for a particular one of the phases that corresponds to the particular one of the plurality of fractional positions between pixel positions, to at least a reference block of video data to generate a motion vector, an estimated block of video data, and a residual error block of video data, wherein the particular phase is selected based on a fractional pixel position, wherein the plurality of phases correspond to fractional positions between two adjacent pixel positions comprising at least ¼ and ¾ of the two adjacent pixel positions, and wherein the polyphase filter comprises at least 6 taps; and
    a motion compensator that generates a compensated block of video data based on said at least a reference block of video data, said residual error block of video data, and the particular phase of the plurality of phases.

10. The apparatus of claim 9 wherein said motion estimator comprises:
    a reference image buffer that stores a reference video image;
    a current image buffer that stores a current video image as a set of current blocks of video data;
    wherein the polyphase filter generates a block of pixel values corresponding to the fractional pixel position from at least one block of said reference video image;
    a video block comparator that compares one block of video data to another block of video data;
    a polyphase filter coefficient bank that stores coefficients of said phases of the polyphase filter; and
    a video block estimator responsive to said reference block of video data and said polyphase filter to generate a set of estimated blocks of video data.

11. The apparatus of claim 10 wherein said video block comparator compares said current block of video data to at least one phase shifted version of said at least a reference block of video data to find a phase shifted reference block of video data that is most similar to said current block of video data.

12. The apparatus of claim 10 wherein said video block comparator compares said set of estimated blocks of video data to said current block of video data to find said estimated block of video data that is most similar to said current block of video data.

13. The apparatus of claim 10 wherein said video block estimator generates said motion vector based on said current block of video data and said estimated block of video data.

14. The apparatus of claim 10 wherein said video block comparator generates said residual error block of video data based on said current block of video data and said estimated block of video data.

15. The apparatus of claim 9 wherein said motion compensator comprises:
   a polyphase filter coefficient bank that stores a set of polyphase filter coefficients; and
   a video compensation module generating said compensated block of video data based on said polyphase prediction filter, said reference block of video data, and said residual error block of video data.

16. The apparatus of claim 15 wherein said video compensation module generates said estimated block of video data based on said particular phase and at least said reference block of video data.

17. The apparatus of claim 15 wherein said video compensation module applies said residual error block of video data to said estimated block of video data to generate said compensated block of video data.

18. A system for encoding video data, said system comprising:
   a reference pixel buffer for storing at least a block of reference pixels;
   a polyphase filter bank for storing coefficients for a plurality of phases, wherein each phase corresponds to a corresponding one of a plurality of fractional positions between pixel positions; and
   a polyphase filter for generating a block of pixel values corresponding to a particular one of the plurality of fractional positions between pixel positions by selecting coefficients for a particular one of the phases that corresponds to the particular one of the plurality of fractional positions between pixel positions, wherein the plurality of fractional positions between adjacent pixel positions comprise at least ¼ and ¾; and
   wherein the polyphase filter comprises at least 6 taps.

19. The system of claim 18, wherein the polyphase filter directly calculates pixel values for the block of pixel values corresponding to the ¼ pixel position from the block of reference pixels.

20. The system of claim 18, wherein the plurality of fractional positions between pixel positions comprise at least ⅛, ⅜, ⅝, and ⅞.

21. The system of claim 18, wherein the polyphase filter directly calculates pixel values for the block of pixel values corresponding to the ⅛ pixel position from the block of reference pixels.

* * * * *